Patented Oct. 29, 1935

2,019,239

UNITED STATES PATENT OFFICE 2,019,239

COMPOSITION OF MATTER AND METHOD OF PRODUCING SAME

Douglas Frank Twiss, Wylde Green, Birmingham, and Eric William Bower Owen, Walmley, Birmingham, England, assignors to Dunlop Rubber Company Limited, London, England, a British company No Drawing. Application April 26, 1934, Serial No. 722,512. In Great Britain August 8, 1933

12 Claims. (Cl. 106—23)

Our invention relates to a method for producing road and the like surfaces, wall coverings, protective coatings, molded shapes and blocks and rubber goods such as soling for boots and shoes and rubber matting.

The object of the invention is to provide by an improved method for producing articles of the above type from mixtures of a dispersion of rubber and cement so that the time necessary for initial solidification is shortened, the maintenance of uniformity of the composition is improved and an improved interpenetration of the rubber and the cement takes place.

According to our invention a mixture of aqueous dispersions of rubber of the kinds hereinafter specified, of cement and of a hydrophylic colloid is treated to convert the hydrophylic colloid by chemical action into an irreversible gel prior to or concurrent with coagulation of the aqueous dispersions aforesaid and prior to the setting of the cement.

The hydrophylic colloid for the purpose may conveniently be a soluble alginate or a form of gelatin or glue.

The soluble alginate, e. g., sodium or ammonium alginate is capable of being gelled by salts of calcium and of other metals and by various cements, e. g., Ciment fondu, Portland cement, plaster of Paris, which probably cause this gelling on account of their content of potentially soluble calcium. Alkalies such as calcium hydroxide, potassium hydroxide, sodium carbonate or ammonia accelerate this gelling of a soluble alginate by a cement such as Ciment fondu, a quick setting aluminum cement. Casein, however, retards this gelling as also does rubber latex, the latter owing its effect possibly to protective colloids in it. It is also possible by the addition of modifying agents as e. g., sodium silicate to suppress any tendency of the latex or alginate to premature coagulation, in this way, providing a reasonable period during which the mixture can be laid without unduly delaying the subsequent complete setting of the mixture. The addition of Portland cement to Ciment fondu increases the rate of gelling by the latter, but Ciment fondu is capable of causing gelling without such aid. After the mixture has been spread or shaped, it may be advantageous to expedite the setting of the surface by application of a suitable rapid coagulant, e. g., a solution of calcium chloride (10%) in water or calcium sulphate powder. Such coagulants can be conveniently applied by brushing, spraying or dusting.

The result is an immediate increase of strength in the surface and does not interfere with the subsequent drying but even appears to hasten it.

As a source of necessary soluble alginate, suitable seaweed, e. g., of the Laminaria type, may be heated with water containing sodium carbonate or other alkali to give the necessary alginate solution.

Instead of an alginate, gelatin or glue can be used as the hydrophylic colloid capable of gelation. A solution of gelatin, e. g., slightly peptized by the addition of a little potassium hydroxide to the warm solution can be incorporated in the mixture. Gelling in this case can be effected by the inclusion of paraformaldehyde with the cement. Instead of paraformaldehyde, other forms of formaldehyde or bodies capable of giving rise to formaldehyde may be used.

The dispersions of rubber or the like comprise those consisting of or containing rubber, gutta-percha, balata or similar vegetable resins occuring naturally or artificially obtained and in vulcanized or unvulcanized condition. Such artificial aqueous dispersions may include those of coagulated rubber, synthetic rubber, vulcanized rubber, waste or reclaim.

If desired, any of the aforementioned dispersions may be used alone or in admixture with one another.

Any of the aforesaid dispersions may contain usual known compounding ingredients and/or may be in concentrated form.

Ingredients may also be incorporated in the final mixture including ingredients for the modifying of the cement constituent (e. g. sand) or of the rubber constituent (e. g. sulphur) or of both concurrently. They may be introduced either by addition separately or simultaneously with one another or together with the prime ingredients. The incorporation of fibre and of disintegrated rubber, especially of disintegrated vulcanized rubber or of rubber tire carcases is advantageous.

Concentrates such as are obtained in Patent 1,846,164 or in British Patent 219,635 in which may be incorporated any one or more of the usual compounding ingredients may also be used.

The following are given by way of example as to how the method can be carried into effect.

Example I

| | Parts by weight |
|---|---|
| Asbestos fibre | 20 |
| Ciment fondu | 110 | are thoroughly mixed together. This mixture is then admixed with a latex mixing of the following composition:

| | Parts by weight |
|---|---|
| Latex of 50% total solids | 150 |
| Sodium alginate | 3 |
| Casein | 1 |
| Caustic potash | 0.5 |
| Water (to dissolve these components) | 25 |

This mixture gels in 20 minutes and is sufficiently hard to bear walking on in 24 hours.

Example II

| | Parts by weight |
|---|---|
| Asbestos fibre | 25 |
| Ciment fondu | 55 | are thoroughly mixed together. This mixture is then admixed with a latex mixing of the following composition:

| | Parts by weight |
|---|---|
| Latex of 55% total solids | 200 |
| Ammonium alginate | 3 |
| Casein | 1 |
| Caustic potash | 0.5 |
| Water (to dissolve these components) | 25 |

This mixture gels in ten minutes and subsequently hardens in the course of 24 hours as in Example I.

Example III

| | Parts by weight |
|---|---|
| Asbestos fibre | 20 |
| Ciment fondu | 110 |
| Sand | 25 | are thoroughly mixed together. This mixture is then admixed with a latex mixing of the following composition:

| | Parts by weight |
|---|---|
| Latex of 50% total solids | 150 |
| A seaweed of laminaria type digested with sodium carbonate, thereby producing crude sodium alginate | 12 |
| Caustic potash | 0.5 |
| Water sufficient to dissolve these components | 25 |

This gels in 25 minutes and sets hard in 24 hours.

Example IV

| | Parts by weight |
|---|---|
| Ciment fondu | 110 |
| Sand | 75 |
| Paraformaldehyde | 0.1 | are thoroughly mixed. This mixture is then admixed with a latex mixing of the following composition:

| | Parts by weight |
|---|---|
| Latex of 50% total solids | 150 |
| Casein | 1 |
| Gelatin | 5 |
| Caustic potash | 0.5 |
| Water to dissolve these components | 25 |

This gels in 35 minutes and becomes hard in two or three days.

Example V

| | Parts by weight |
|---|---|
| Ciment fondu | 25 |
| Ground motor carcases | 15 | are thoroughly mixed. This mixture is then admixed with a latex mixing of the following composition:

| | Parts by weight |
|---|---|
| Latex of 54% total solids | 100 |
| Sodium alginate | 1 |
| Casein | 1 |
| Caustic potash | 1 |
| Water to dissolve above | 10 |

The mixture gels in about 35 minutes and is hard enough to bear foot traffic in 24 hours.

Example VI

A mixture of

| | Parts by weight |
|---|---|
| Sodium alginate | 2 |
| Casein | 2 |
| Caustic potash | 1 |
| Water (to dissolve these ingredients) | 20 | is admixed with 100 parts of latex of 60% dry rubber content. A mixture of the following composition is then incorporated

| | Parts by weight |
|---|---|
| Ground motor carcases | 30 |
| Plaster of Paris | 20 |
| China clay | 10 |

The complete mixture sets in 25 minutes and is hard after 24 hours.

Example VII

A mixture of

| | Parts by weight |
|---|---|
| Sodium alginate | 1 |
| Casein | 1.5 |
| Sodium silicate | 0.5 |
| Water (to dissolve these ingredients) | 17.5 | is admixed with 100 parts of latex of 60% dry rubber content. A mixture of the following composition is then incorporated.

| | Parts by weight |
|---|---|
| Ground motor carcases | 30 |
| Portland cement | 27.5 |
| Sulphur | 1.5 |
| Zinc oxide | 1.5 |
| Zinc diethyldithic-carbamate | 0.5 |
| Anti-oxidant | 0.5 |

The surface of the compound when laid is then painted with a 20% solution of calcium chloride. The laid material sets after 20 minutes and is hard after 24 hours.

Example VIII

A mixture of

| | Parts by weight |
|---|---|
| Sodium alginate | 1 |
| Casein | 2 |
| Caustic potash | 1 |
| Water (to dissolve these ingredients) | 14 | is admixed with 100 parts of latex of 60% dry rubber content.

A mixture of the following composition is then incorporated:

| | Parts by weight |
|---|---|
| "Snowcrete" | 25 |
| Zinc oxide | 10 |
| Asbestos fibre | 12 |

This produces a white compound which sets in 15 minutes and is hard after 30 hours.

Rubber goods such as shoe soling and rubber matting can be produced from the latex and cement admixtures either by spreading or molding with subsequent drying and, if desired, remolding. Preferably shoe soling and rubber matting would be made in sheet form, although this sheet may be further cut into suitable shapes.

Again, the higher proportion of rubber present in the final product, whether the rubber is derived from rubber latex or has been added as disintegrated rubber, the softer and the more rubbery will the final product be. The less the proportion of rubber present, the more will the final product have cement-like properties. Thus, by varying the proportions of cement and rubber present in the final mixture, it is possible to prepare products having either a cement-like nature or a rubbery nature.

Various proposals have already been made for admixing rubber latex with cement and the like wherein the admixture prepared comprises rubber latex, cement, and a hydrophilic colloid. In contradistinction to all such proposals it is to be understood that in accordance with the present invention the hydrophilic colloid in the admixture has to be converted by chemical action into an irreversible gel prior to the setting of the cement.

According to the invention this conversion of the hydrophilic colloid into an irreversible gel can be effected either by employing a hydrophilic colloid of the type e. g., a soluble alginate, which is capable of giving an irreversible gel on reacting with the calcium ions derived from the cement or if the hydrophilic colloid employed is not capable of producing an irreversible gel in this manner then to effect the conversion an additional reagent capable of gelling this type of hydrophilic colloid is added e. g. formaldehyde is added e. g. formaldehyde is added if gelatin is the hydrophilic colloid employed.

What we claim is—

1. An improved method for producing articles of the type described from mixtures of aqueous dispersions of rubber material, cement and a hydrophilic colloid of the class consisting of gelatins and soluble alignates which comprises converting the hydrophilic colloid in said mixture by an additional gelling reagent into an irreversible gel prior to setting of the cement and coagulating said aqueous dispersions.

2. A method of producing articles of the type described from mixtures of aqueous dispersions of rubber material, cement and a soluble alginate which comprises converting the soluble alginate in said mixture into an irreversible gel prior to setting of the cement, and coagulating said aqueous dispersions.

3. The method of claim 2 in which the gelling is accelerated by the addition of an alkaline reacting agent.

4. The method of claim 2 in which the alginate is gelled by salts of calcium.

5. The method of claim 2 in which the alginate is gelled by a mixture of Portland cement and Ciment fondu.

6. The method of claim 2 in which the alginate is gelled in the presence of sodium silicate.

7. A method for producing articles of the type described from mixtures of aqueous dispersions of rubber material, cement and gelatin which comprises gelling the gelatin by an added gelling agent into an irreversible gel prior to setting the cement and coagulating said aqueous dispersions.

8. The method of claim 7 in which the added gelling agent is formaldehyde.

9. The method of producing articles of the type described from mixtures of aqueous dispersions of rubber material, cement and an organic hydrophilic colloid capable of gelling and admixed fibers which comprises converting the colloid in said mixture into an irreversible gel prior to setting of the cement and coagulating the aqueous dispersions.

10. The method of producing articles of the type described from mixtures of aqueous dispersions of rubber material, cement and an organic hydrophilic colloid capable of gelling and disintegrate vulcanized rubber which comprises converting the colloid in said mixture into an irreversible gel prior to the setting of the cement and coagulating the aqueous dispersions.

11. The method of producing articles of the type described from mixtures of aqueous dispersions of rubber material, cement and an organic hydrophilic colloid of the type consisting of gelatin and soluble alginates which comprises converting the hydrophilic colloid into an irreversible gel prior to setting of the cement, shaping the mixture and setting the surface of the set mixture by a coagulant.

12. The method of producing articles of the type described from mixtures of aqueous dispersions of rubber material, cement and an organic hydrophilic colloid of the class consisting of the gelatins and soluble alginates which comprises reacting said colloids to convert them into an irreversible gel prior to setting of the cement, coagulating aqueous dispersions and setting the cement.

DOUGLAS FRANK TWISS.
ERIC WILLIAM BOWER OWEN.